July 31, 1973           E. I. BIBB          3,749,594
METHOD OF CONSTRUCTING REINFORCED ARTICLES HAVING A
PLASTIC CORE, AND FRAME THEREFOR
Filed Dec. 2, 1970                            3 Sheets-Sheet 1

INVENTOR.
EVERETT I. BIBB
BY
*Isler & Ornstein*
ATTORNEYS

July 31, 1973
E. I. BIBB
3,749,594
METHOD OF CONSTRUCTING REINFORCED ARTICLES HAVING A
PLASTIC CORE, AND FRAME THEREFOR
Filed Dec. 2, 1970
3 Sheets-Sheet 3
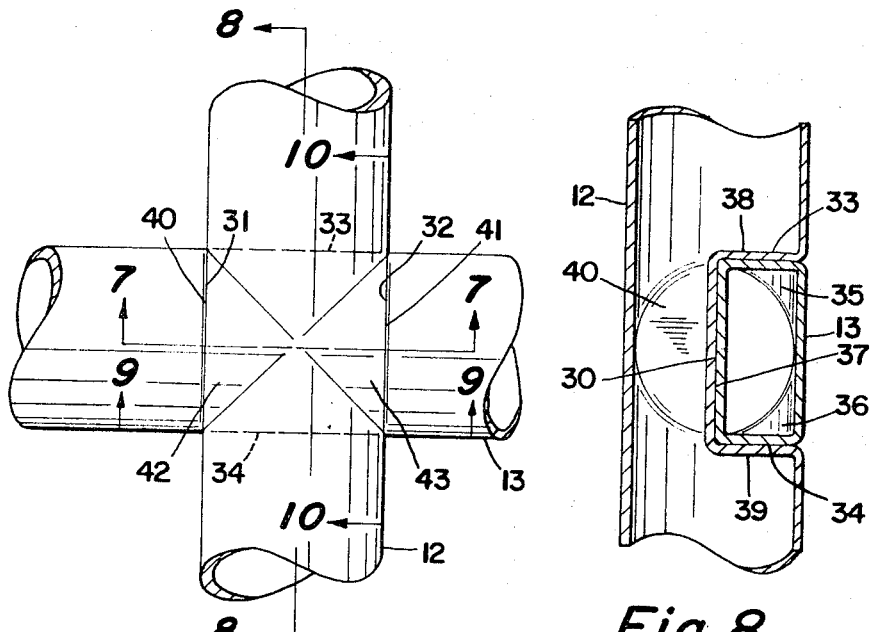
Fig. 6
Fig. 8
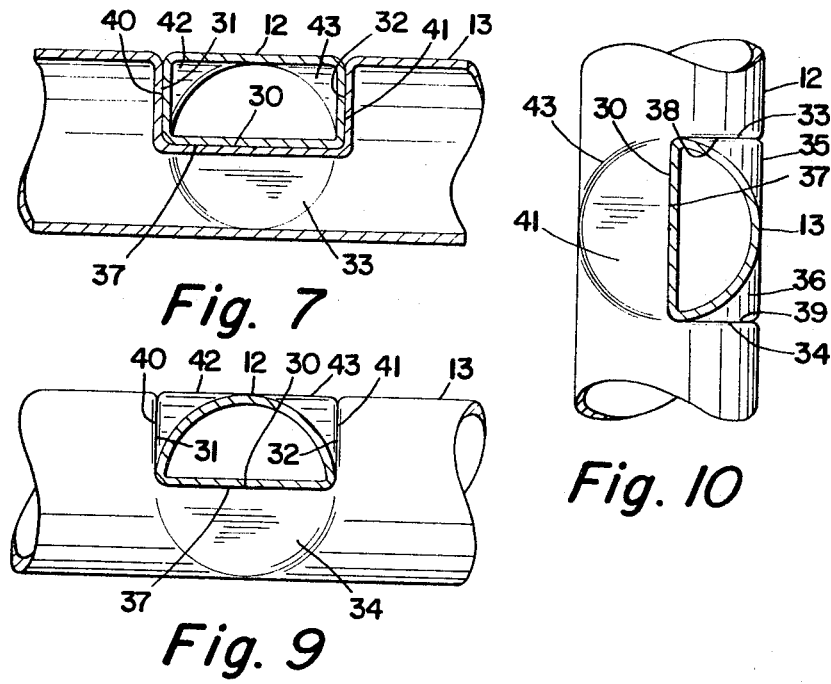
Fig. 7
Fig. 9
Fig. 10
INVENTOR.
EVERETT I. BIBB
BY
Isler & Ornstein
ATTORNEYS

United States Patent Office 3,749,594
Patented July 31, 1973

3,749,594
METHOD OF CONSTRUCTING REINFORCED ARTICLES HAVING A PLASTIC CORE, AND FRAME THEREFOR
Everett I. Bibb, 24225 San Pedro Lane, Carmel, Calif. 92921
Filed Dec. 2, 1970, Ser. No. 94,398
Int. Cl. B05b 7/00; B32b 3/26
U.S. Cl. 117—104 A    4 Claims

ABSTRACT OF THE DISCLOSURE

A method is described of constructing boats or the like, in which a reinforced core is used, consisting of a skeleton frame or lattice embedded in a thermosetting plastic or resin. The plastic is sprayed against one side of the frame, while a flexible impervious member is maintained against the opposite side of the frame, so that when said member is removed, the surface of that side of the core from which said member is removed, requires little or no finishing. The frame consists of intersecting tubular members, which are joined together at their points of intersection in a novel manner.

---

In Pat. No. 2,122,300, a method of constructing a boat or the like is described, in which a skeleton frame composed of rods or tubes of metal is formed, which frame is fashioned or shaped to produce the desired cross-section and longitudinal contour of the boat, these rods or tubes being preferably welded together where they abut.

A sheet of openwork fabric is secured, as by welding, to the inner or outer surface of the skeleton frame, and the sheet may be composed of wire mesh. In some cases, two openwork bodies or sheets may be arranged one directly upon the other with the sheets having meshes of different sizes as well as composed of lighter and heavier wires. Moreover, a large mesh sheet may be arranged on the outer surface of the skeleton frame, and a smaller mesh sheet on the inner surface thereof.

After the sheet or sheets have been arranged on the frame, a body portion of plastic or similar material is then applied so as to imbed the frame and the said sheet or sheets therein to form smooth inner and outer surfaces which will define the hull and superstructure of the boat.

Several methods of applying the plastic or similar material are described, one of these methods involving spraying the plastic by means of a pressure spray with the exposed surfaces later sanded to provide a smooth and definite contour and surface.

The plastic which is used in the aforesaid patent may be a liquid, semi-liquid, or plastic substance incorporated with a suitable binder which may also act as a reinforcing agent in constructing the boat. The plastic material may have metallic bases or wood pulp, cellulose, or fibrous bases, and the patent cites, by way of example, the use of "Plastic Wood," which the patentees use in a semi-liquid form by incorporating acetone therewith, as a solvent, in the proportions of one and one-half pints of the solvent to one pound of the "Plastic Wood."

In spraying the frame and sheets of wire mesh, by a pressure spray, it is obvious that a substantial portion of the plastic will pass through the frame and wire mesh, and into the atmosphere, and is thus lost, so that the method is not economical. Moreover, if the plastic contains a volatile solvent, such as acetone the fumes of the solvent, escaping into the atmosphere, can be hazardous to the workman and others in the area of construction.

Other disadvantages of the foregoing method include (a) the cost of the wire mesh sheets, as well as the labor involved in welding the wire mesh sheets to the skeleton frame, (b) the substantial increase in weight of the structure, due to the fact that the wire mesh sheets remain in situ, and (c) the increased labor cost due to the fact that both sides of the structure must be sanded to form smooth inner and outer surfaces and to reduce the overall thickness of the structure to desired uniformity.

The present invention has, as its primary object, a method of constructing a boat or the like which eliminates all of the aforesaid disadvantages, and reduces the labor costs involved in such construction to a minimum, which is far below that involved in constructing a boat in accordance with the method of the aforesaid patent.

Another object of the invention is to provide a method of the character described, in which the use of wire mesh sheets and their retention in the core are completely obviated.

Another object of the invention is to provide a method of the character described, in which an impervious removable back stop of flexible, preferably non-metallic material, is utilized during the spraying operation, to thereby obtain a smooth finish on at least one side or surface of the plastic, without requiring sanding or finishing of that side.

A further object of the invention is to provide a method of the character described, in which only one side or surface of the plastic need be sanded or finished, utilizing the skeleton frame as a guide and control in smoothing and finishing that side or surface.

A further object of the invention is to provide a method of the character described in which certain selected types of plastics are used in forming the boat, which plastics have considerable buoyancy, as well as insulating qualities for resisting vibration noise, and temperature changes.

A further object of the invention is to provide a skeleton frame made of metallic tubes or tubing, which are interconnected or joined together in a manner which provides great strength, while maintaining the overall thickness of the frame to a uniform dimension which does not exceed the diameter of the tubes or tubing.

A still further object of the invention is to provide a novel method of forming and joining the tubes which form the skeleton frame.

Other objects and advantages of my invention will be apparent during the course of the following description.

In the accompanying drawings forming a part of this specification, and in which like numerals are employed to designate like parts throughout the same, FIG. 1 is a perspective view of a boat hull in the process of being manufactured by the method of the present invention;

FIG. 6 is a fragmentary plan view showing one of the frame joints;

FIG. 7 is a fragmentary cross-sectional view, taken on the line 7—7 of FIG. 6;

FIG. 8 is a fragmentary cross-sectional view, taken on the line 8—8 of FIG. 6;

FIG. 9 is a fragmentary cross-sectional view, taken on the line 9—9 of FIG. 6; and FIG. 10 is a fragmentary cross-sectional view, taken on the line 10—10 of FIG. 6.

Figure 1:
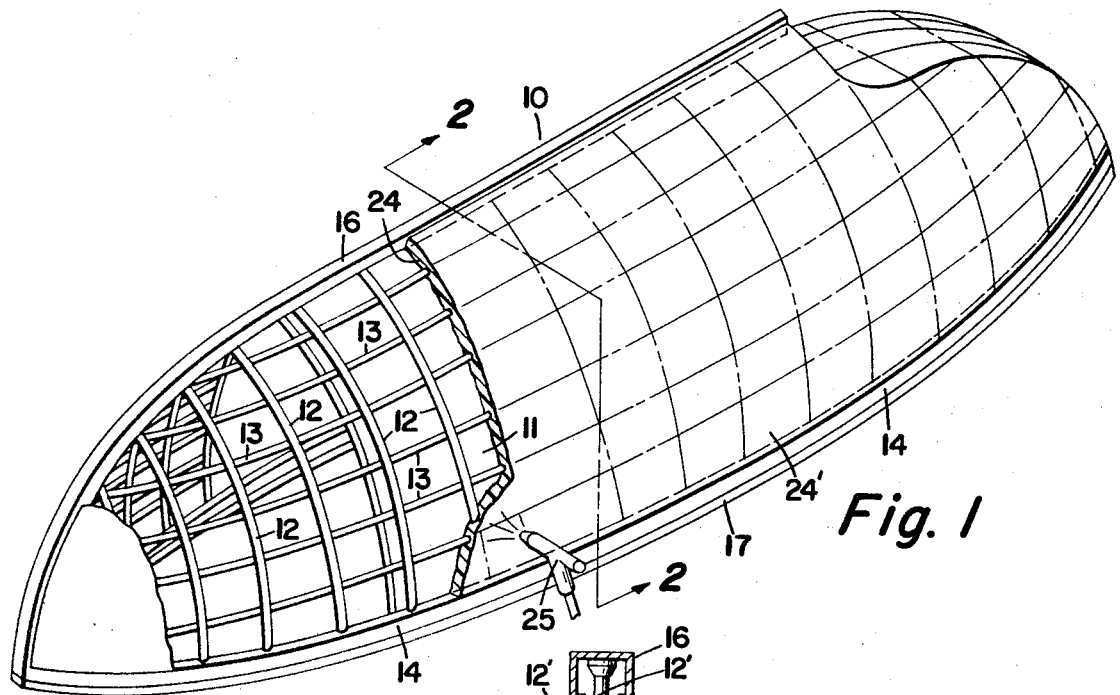

Referring more particularly to FIGS. 1 to 5 inclusive of the drawings, there is shown a boat hull generally designated by the reference numeral 10.

The hull comprises a skeleton frame, lattice or armature, generally designated by reference numeral 11, and made up of ribs or cross-members 12 and longitudinal members 13. The members 12 and 13 are of the same diameter and are preferably made of steel tubing, joined together and welded at their points of intersection in such a manner that the thickness of the frame at such points of intersection is substantially the same as that of all other portions of the frame, so that the frame, to all intents and purposes, is of substantially uniform thickness throughout, such thickness corresponding to the outside diameter of the tubes. The manner in which this is accomplished will be presently described.

Figure 2:
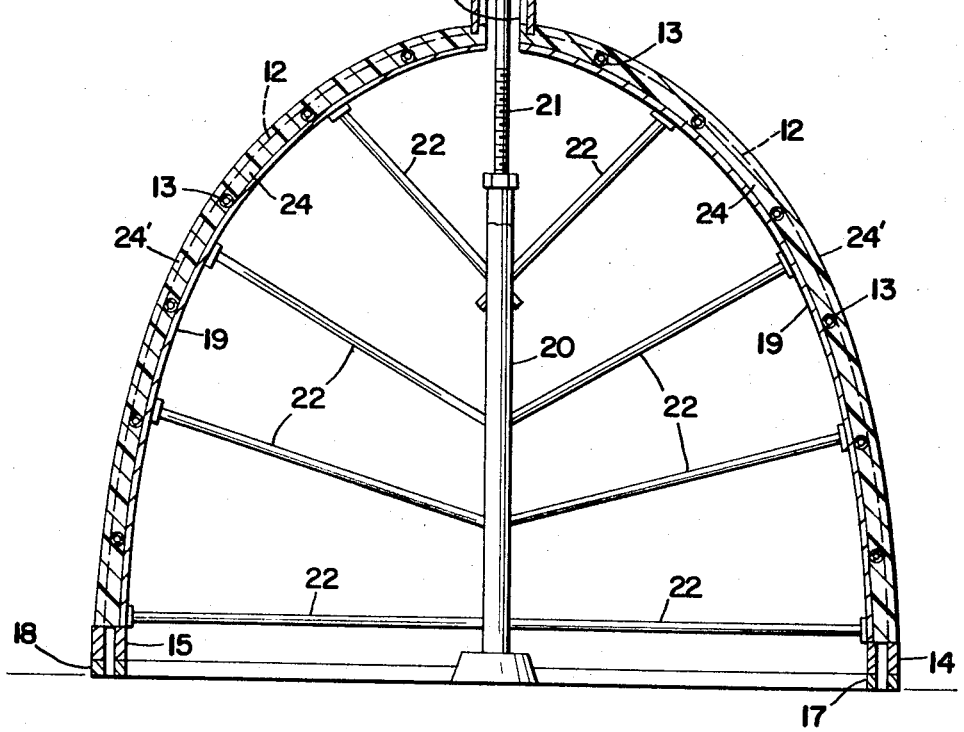
FIG. 2 is a transverse cross-sectional view, taken on the line 2—2 of FIG. 1.

The ribs or cross-members 12 at one side of the structure are secured at their outer ends in a gunwale member 14, while the ribs or cross-members 12 at the other side of the structure are secured at their outer ends in a similar gunwale member 15. The inner ends of the ribs or cross-members 12 are flattened, as at 12', and these flattened ends are secured to a keel member 16. As best seen in FIGS. 1 and 2, the gunwale members 14 and 15 rest on permanently formed blocks 17 and 18 which also receive the protuberant ends of the ribs or cross-members 12.

When the skeleton frame is thus completed, a member 19 (FIG. 2) is applied, as a backstop, to the inner side of the skeleton frame, and a series of stanchions 20 are arranged at longitudinally-spaced points along the center line of the hull, and, by means of adjustable posts 21, are brought to bear against the keel member 16. Each stanchion 20 supports a plurality of adjustable struts or arms 22, which may be brought to bear at desired points against the member 19 to thus hold the latter against the skeleton frame.

The member 19 is preferably made of a flexible impervious material, such, for example, as linoleum, which is coated on its outer surface with wax, for a purpose to be presently described. While linoleum is a preferred material from which to form the backstop 19, other flexible, impervious materials may be used for this purpose, such as plastic sheets, with such plastic sheets being reinforced, if desired, as strength requirements may dictate. Instead of the wax coating, to which reference has been made, thin plastic sheets, such as cellophane, may be used at the outer surface of the member 19. The member 19 must be sufficiently flexible to permit it to be conformed to the contour of the skeleton frame, yet sufficiently strong to prevent bulging of the material outwardly into the openings of the skeleton frame.

The hull is now ready for the application of the plastic or plastic material 24 in which the skeleton frame is to become embedded.

For this purpose, a fluid plastic, such as polyurethane foam, is preferably employed, and is sprayed against the frame and backstop 19 by means of a conventional spray gun 25 (see FIG. 1). Polyurethane foam has a bubbly or sudsy consistency on emanating from a spray gun, but on exposure to the atmosphere, solidifies or sets as a solid porous substance, in a fine state of cellular subdivision.

Although polyurethane foam is preferred as the plastic material, it is to be understood that other thermosetting resins, may be employed, that is to say, synthetic resins which solidify or set on heating or exposure to air and cannot be reshaped once they have been fully cured. These include resins of the phenol-formaldehyde and urea-formaldehyde type, as well as polyester and epoxy resins.

Figure 3:
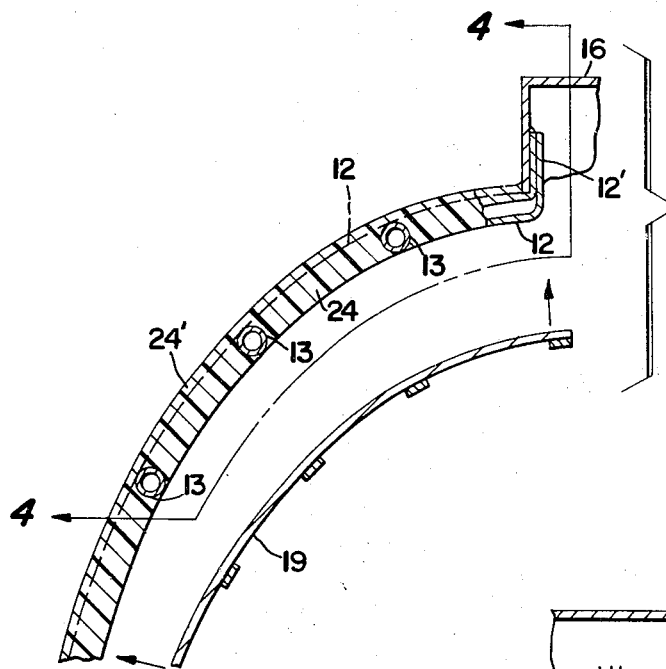
FIG. 3 is a fragmentary cross-sectional view, on an enlarged scale, of a portion of FIG. 2, and showing the flexible backing sheet in the process of being removed from the core.
Figure 4:
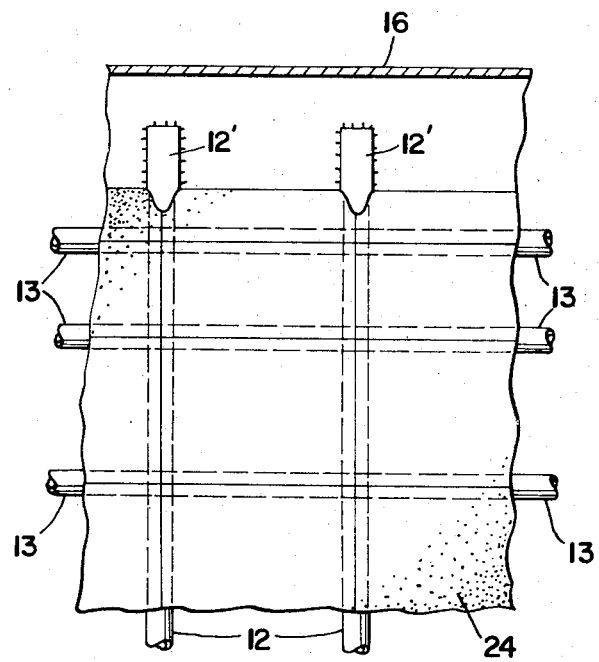
FIG. 4 is a fragmentary elevational view, as viewed in the direction indicated by the line 4—4 of FIG. 3.
Figure 5:
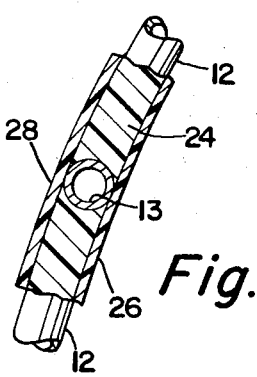
FIG. 5 is a fragmentary cross-sectional view, on an enlarged scale, showing the application of finish layers or laminations to the reinforced foam core.

Since the open expansions of such foams are not uniformly precise, an "overspray" of foam is used, such overspray being depicted in somewhat exaggerated thickness, by the reference numeral 24' in FIGS. 2 and 3.

The "overspray" or excess of foam, after the foam has set and is fully cured, may be removed down to the frame, by either sanding, or through the use of special cutting tools.

There is thus formed a buoyant, reinforced foam core, in the shape of the boat which is being constructed, such core consisting of the plastic foam and the skeleton frame which is embedded in the foam.

When the outer surface of this core has been contoured and smoothed, the stanchions 20 and arms 22 may be removed, and the backstop member 19 dropped away from the core, as shown in FIG. 3, leaving a core, smooth on both sides, and with only the lines of tangency of the tubes of the metal frame with the inner and outer surfaces of the core exposed or substantially exposed.

Due to the wax coating of the member 19, or the cellophane sheet on the outer surface of the member 19, the member 19 can be easily stripped away from the core, without affecting, in any way, the inner surface of the core.

The core, or "form," as it may be termed, may then be coated, both inside and outside, with layers or laminations of sprayed-on fibre glass, or may have applied thereto laminations of glass cloth or the like. Such layers or laminations are generally indicated by reference numerals 26 and 28 in FIG. 5.

Instead of using stanchions and arms or struts to support or maintain in position the backstop member or members 19, inflated air envelopes or bags may be used for this purpose, such envelopes or bags being deflated after the core has been constructed, to permit removal of the backstop members.

It is thus seen that I have provided a method of constructing a boat in which the use of wire mesh sheets and their retention in the core is obviated; in which an impervious removable backstop of flexible material is utilized during the spraying operation, to thereby obtain a smoothing and finishing the outer side of the core; and in requiring sanding or finishing of that side; in which the skeleton frame is utilized as a guide and control in smoothing and finishing the outer side of the core; and in which certain selected types of plastics or resins are used in forming the core, which plastics or resins have considerable buoyancy, as well as insulating qualities for resisting vibration, noise, and temperature changes.

Reference has been made above to the fact that the steel tubes of which the frame is made are joined together and welded at their points of intersection in such a manner that the thickness of the frame at such points of intersection is substantially the same as that of all other portions of the frame, so that the frame, to all intents and purposes, is of substantially uniform thickness throughout, such thickness corresponding to the outside diameter of the tubes.

This is accomplished in the manner shown more particularly in FIGS. 6-10 inclusive of the drawings.

Referring to FIGS. 6, 7, 8, 9 and 10, of the drawings, it will be seen that the tubes 13, at their points of intersection with the tubes 12, are deformed, through the use of heat and suitable dies, to provide notches, which are defined by a substantially rectangular seat 30, which extends substantially diametrically of the tube 13, and the dimensions of which are substantially the same as the outside diameter of the tube, and upstanding end walls 31 and 32, which are of substantially semi-circular contour.

At the same time, the lower portion of the tube 13, in the area of the notch, is extruded or shaped to provide shoulders consisting of semi-circular vertical walls 33 and 34 which are substantially tangential to the outer wall of the tube, and are interconnected with the outer wall of the tube by walls 35 and 36 of arcuate cross-section, which extend horizontally to such outer wall.

The tubes 12, at their points of intersection with the tubes 13, are similarly deformed, through the use of heat and suitable dies, to provide notches, which are defined by a substantially rectangular seat 37, which extends substantially diametrically of the tube 12, and the dimensions of which are substantially the same as the outside diameter of the tube and depending end walls 38 and 39, which are of substantially semi-circular contour, and which, when the tubes 12 and 13 are nested within each other, as shown in FIG. 6, lie adjacent the walls 33 and 34 respectively.

At the same time, the upper portion of the tube 12, in the area of the notch, is extruded or shaped to provide shoulders consisting of semi-circular vertical walls 40 and 41, which are substantially tangential to the outer wall of the tube 12, and are interconnected with the outer wall of the tube 12 by walls 42 and 43 of arcuate cross-section, which extend horizontally to such outer wall.

When the tubes 12 and 13 are nested within each other, as shown in FIG. 6, the shoulders 40 and 41 of the tube 12 will lie adjacent the end walls 31 and 32 respectively of the tube 13, and the tubes may be welded to each other by means of welding procedures, such as fusion welding by induction heating at the joint areas.

This technique of joining has the following advantages:

(1) The continuity of shape of each tube, in relation to the other tube, appears to be maintained at each joint.

(2) A close, tight, fitting is attained at each joint, and the joint has great strength.

(3) No cutting, removal, or elimination of material is required at the joint.

(4) A means is provided for rapidly producing a multiplicity of joint areas in long lengths of tubing, as required in forming the skeleton frame which has been described.

(5) The amount of time, material, and cost of welding is reduced to a minimum.

(6) The fusion of the material at the joints, through the use of appropriate welding methods, including fusion welding by induction heating, is made possible, thereby eliminating conventional welding procedures, utilizing weld metals.

(7) It permits the formation of joints at various angles of intersection, along the same length of tube.

(8) It makes possible the maintenance of a uniformity of thickness at the joint, which thickness does not exceed the outside dimension of each tube.

(9) It provides a space through each tube, equivalent to half the cross-sectional area of the tube, which space is available for use as a conduit for electric wire, water, fuel, air, etc.

Although the invention has been described more particularly with reference to the construction of a boat or the like, it is to be understood that it may be applied to the construction of a wide variety of other objects, including, for example, refrigerator bodies.

It is to be understood that the form of my invention, herewith shown and described, is to be taken as a preferred example of the same, and that various changes may be made in the shape, size and arrangement of parts thereof, without departing from the spirit of the invention, or the scope of the subjoined claims.

Having thus described my invention, I claim:

1. In a method of forming articles of reinforced foamed thermoset resin, the steps of providing a lattice or skeleton frame approximating the shape of the article desired, said lattice having a predetermined thickness and including portions of curved contour, temporarily positioning against one side of the lattice and in contoured conformity therewith a thin sheet of flexible impervious material, spraying against the opposite side of the lattice or skeleton frame a thermosetting resin foam, to a depth at least equivalent to the thickness of the frame and such that the frame is substantially completely embedded in the foam, heating said foam to harden or set, and thereafter removing said flexible sheet thereby to expose the side of the frame against which said sheet was temporarily positioned.

2. The method, as defined in claim 1, wherein said thermosetting resin is selected from the group consisting of polyurethane foam, resins of the phenol-formaldehyde, urea-formaldehyde type, polyester and epoxy resins.

3. The method, as defined in claim 1, wherein said flexible impervious material is selected from the group consisting of linoleum and plastic sheet material.

4. The method, as defined in claim 1, wherein said lattice or skeleton frame consists of tubular metallic elements, which intersect each other, and are joined to each other at the points of intersection, the thickness of the frame at the points of intersection being substantially the same as the outside diameter of said elements.

References Cited
UNITED STATES PATENTS

| | | | |
|---|---|---|---|
| 2,813,050 | 11/1957 | Hickson | 9—6 |
| 3,007,208 | 11/1961 | Urban | 9—6 |
| 3,046,180 | 7/1962 | Diehl et al. | 156—246 |
| 3,082,486 | 3/1963 | Khawam et al. | 264—45 |
| 3,277,219 | 10/1966 | Turner | 264—45 |

WILLIAM J. VAN BALEN, Primary Examiner

U.S. Cl. X.R.

9—6; 52—309; 114—65.1; 117—104 R, 105.1; 161—159, 160, 406